US012273805B2

(12) United States Patent
Dang et al.

(10) Patent No.: US 12,273,805 B2
(45) Date of Patent: Apr. 8, 2025

(54) INLINE INTERFERENCE MANAGEMENT

(71) Applicant: Fraunhofer-Gesellschaft zur Förderung der angewandten Forschung e.V., Munich (DE)

(72) Inventors: Thi Uyen Ly Dang, Erlangen (DE); Thomas Heyn, Erlangen (DE); Alexander Hofmann, Erlangen (DE); Elke Roth-Mandutz, Erlangen (DE); Thomas Fehrenbach, Berlin (DE); Leszek Raschkowski, Berlin (DE)

(73) Assignee: Fraunhofer-Gesellschaft zur Förderung der angewandten Forschung e.V. (DE)

( * ) Notice: Subject to any disclaimer, the term of this patent is extended or adjusted under 35 U.S.C. 154(b) by 553 days.

(21) Appl. No.: 17/452,501

(22) Filed: Oct. 27, 2021

(65) Prior Publication Data

US 2022/0046517 A1 Feb. 10, 2022

Related U.S. Application Data

(63) Continuation of application No. PCT/EP2019/061312, filed on May 2, 2019.

(51) Int. Cl.
*H04W 48/04* (2009.01)
*H04W 48/08* (2009.01)

(52) U.S. Cl.
CPC .......... *H04W 48/04* (2013.01); *H04W 48/08* (2013.01)

(58) Field of Classification Search
CPC .............................. H04B 7/185; H04W 48/02
USPC ......................................................... 455/434
See application file for complete search history.

(56) References Cited

U.S. PATENT DOCUMENTS

2007/0072603 A1 3/2007 Wang
2008/0064328 A1* 3/2008 Wesel .................... H04B 7/195 455/13.3
2011/0124330 A1 5/2011 Kojima
2014/0192781 A1 7/2014 Teyeb et al.
2016/0323032 A1* 11/2016 Ulupinar ............ H04B 7/18541
2016/0323796 A1 11/2016 Richter
2020/0295854 A1* 9/2020 Narra ..................... H04B 17/21
2020/0296667 A1* 9/2020 Park ...................... H04W 76/27

FOREIGN PATENT DOCUMENTS

EP 2764726 A1 8/2014

OTHER PUBLICATIONS

International Search Report and Written Opinion dated Aug. 12, 2019 issued in PCT App. No. PCT/EP2019/061312 37 pages).
3GPP TS 23.501 V16.0.2 (Apr. 2019), “System Architecture for the 5G System; Stage 2”.

(Continued)

*Primary Examiner* — Fabricio R Murillo Garcia
(74) *Attorney, Agent, or Firm* — Haynes and Boone, LLP

(57) ABSTRACT

A wireless communication system, including: a plurality of time variant transmission points for communicating with a user device, UE, wherein the UE is in a tracking region, wherein the UE is configured to receive and store a list including identifiers, IDs, of time variant transmission points for the tracking region, and wherein the list includes IDs of time variant transmission points which are available or visible for the UE in the one tracking region at different times or time periods.

37 Claims, 6 Drawing Sheets

GEO satellite
in-line interference
MEO satellite

(56) References Cited

OTHER PUBLICATIONS

3GPP TS 22.261 V16.7.0_Mar. 2019, ,,Technical Specification Group Services and System Aspects; Service requirements for the 5G system; Stage 1, Release 16.
3GPP TS 38.300 V15.5.0 (Mar. 2019), "Technical Specification Group Radio Access Network; NR; NR and NG-RAN Overall Description Stage 2".
3GPP TS 38.331 V15.5.1 (Apr. 2014), "NR; Radio Resource Control (RRC) protocol specification" (Release 15).
3GPP TS 36.331 V15.5.1 (Apr. 2019), "Evolved Universal Terrestrial Radio Access (E-UTRA); Radio Resource Control (RRC); Protocol specification," Release 15.
3GPP TR 38.811 V15.4.0 (Sep. 2020), "Study on New Radio (NR) to support non-terrestrial networks".
ITU Radio Regulations RR 2016, vol. 1.
Sharma et al.; Inline Interference Mitigation Techniques for Spectral Coexistence of GEO and NGEO Satellites, American Institute of Aeronautics and Astronautics, 2016.
"LTE Cell Selection," retrieved from the internet on Nov. 30, 2021: https://web.archive.org/web/20190130152643/http://lteinwireless.blogspot.com/2011/04/lte-cell-selection.html.
"LTE Quick Reference: Access Control," retrieved from the internet on Nov. 22, 2021: http://www.sharetechnote.com/html/Handbook_LTE_AccessControl.html.

* cited by examiner

| ID trans. point | validity window |
|---|---|
| ID 1 | $t_1 - t_2$ |
| ID 2 | $t_3 - t_4$ |
| ⋮ | ⋮ |
| ID 6 | — |
| ID 7 | $t_1 - t_2$ |
| ⋮ | ⋮ |
| ID N | $b_x - b_y$ |

static content dynamic content

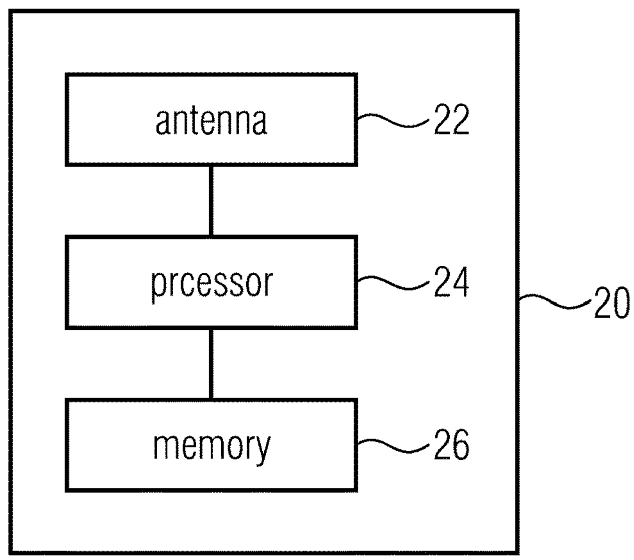
Fig. 6
| UE coarse position | forbidden antenna pointing directions |
| --- | --- |
| area a | direction #a1, ... direction #an |
| area b | direction #b1, ... direction #bm |
| ••• | ••• |
Fig. 7
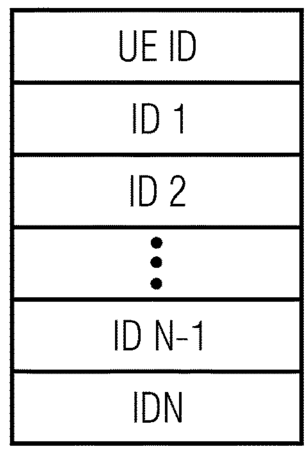
Fig. 8

INLINE INTERFERENCE MANAGEMENT

CROSS-REFERENCE TO RELATED APPLICATIONS

This application is a continuation of copending International Application No. PCT/EP2019/061312, filed May 2, 2019, which is incorporated herein by reference in its entirety.

BACKGROUND OF THE INVENTION

The present application relates to the field of wireless communication systems or networks, more specifically to access control between a user device/equipment (UE) and one of transmission points of a plurality of transmission points, having at least a movable transmission point and a non-movable transmission point, included in the wireless communication system using a list indicating occurrence of an in-line interference between the movable and non-movable transmission points, between movable transmission points, or between non-movable transmission points. Embodiments concern an access control in a wireless communication network using a list indicating the occurrence of an in-line interference between the movable and non-movable transmission points. Other embodiment concerns the UE or the transmission point which generates the list by using position information of the transmitting points and the UE, and the list is stored at the UE. Further embodiment concerns a wireless communication network using a signalling which indicates the occurrence of the in-line interference between the movable and non-movable transmission points, i.e., the signalling including information of blocked UE list (blacklisted UEs).

FIG. 1 below is a schematic representation of an example of a terrestrial wireless network 100 including a core network 102 and a radio access network 104. The radio access network 104 may include a plurality of base stations $gNB_1$ to $gNB_5$, each serving a specific area surrounding the base station schematically represented by respective cells $\mathbf{106_1}$ to $\mathbf{106_5}$. The base stations are provided to serve users within a cell. The term base station, BS, refers to as gNB in 5G networks, eNB in UMTS/LTE/LTE-A/LTE-A Pro, or just BS in other mobile communication standards. A user may be a stationary device or a mobile device. Further, the wireless communication system may be accessed by mobile or stationary IoT devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items or devices having embedded therein electronics, software, sensors, actuators, or the like as well as network connectivity that enable these devices to collect and exchange data across an existing network infrastructure. FIG. 1 shows an exemplary view of only five cells, however, the wireless communication system may include more such cells. FIG. 1 shows two users $UE_1$ and $UE_2$, also referred to as user equipment, UE, that are in cell $\mathbf{106_2}$ and that are served by base station $gNB_2$. Another user $UE_3$ is shown in cell $\mathbf{106_4}$ which is served by base station $gNB_4$. The arrows $\mathbf{108_1}$, $\mathbf{108_2}$ and $\mathbf{108_3}$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. Further, FIG. 1 shows two IoT devices $\mathbf{110_1}$ and $\mathbf{110_2}$ in cell $\mathbf{106_4}$, which may be stationary or mobile devices. The IoT device $\mathbf{110_1}$ accesses the wireless communication system via the base station $gNB_4$ to receive and transmit data as schematically represented by arrow $\mathbf{112_1}$. The IoT device $\mathbf{110_2}$ accesses the wireless communication system via the user $UE_3$ as is schematically represented by arrow $\mathbf{112_2}$. The respective base station $gNB_1$ to $gNB_5$ may be connected to the core network 102, e.g. via the S1 interface, via respective backhaul links $\mathbf{114_1}$ to $\mathbf{114_5}$, which are schematically represented in FIG. 1 by the arrows pointing to "core". The core network 102 may be connected to one or more external networks. Further, some or all of the respective base station $gNB_1$ to $gNB_5$ may connected, e.g. via the S1 or X2 interface or XN interface in NR, with each other via respective backhaul links $\mathbf{116_1}$ to $\mathbf{116_5}$, which are schematically represented in FIG. 1 by the arrows pointing to "gNBs". The wireless network or communication system depicted in FIG. 1 may by a heterogeneous network having two distinct overlaid networks, a network of macro cells with each macro cell including a macro base station, like base station $gNB_1$ to $gNB_5$, and a network of small cell base stations (not shown in FIG. 1), like femto or pico base stations.

For data transmission a physical resource grid may be used. The physical resource grid may comprise a set of resource elements to which various physical channels and physical signals are mapped. For example, the physical channels may include the physical downlink and uplink shared channels (PDSCH, PUSCH) carrying user specific data, also referred to as downlink and uplink payload data, the physical broadcast channel (PBCH) carrying for example a master information block (MIB) and a system information block (SIB), the physical downlink and uplink control channels (PDCCH, PUCCH) carrying for example the downlink control information (DCI), etc. For the uplink, the physical channels may further include the physical random access channel (PRACH or RACH) used by UEs for accessing the network once a UE synchronized and obtained the MIB and SIB. The physical signals may comprise reference signals (RS), synchronization signals and the like. The resource grid may comprise a frame or radioframe having a certain duration, like 10 milliseconds, in the time domain and having a given bandwidth in the frequency domain. The frame may have a certain number of subframes of a predefined length, e.g., 2 subframes with a length of 1 millisecond. Each subframe may include two slots of 6 or 7 OFDM symbols depending on the cyclic prefix (CP) length. A frame may also consist of a smaller number of OFDM symbols, e.g. when utilizing shortened transmission time intervals (sTTI) or a mini-slot/non-slot-based frame structure comprising just a few OFDM symbols.

The wireless communication system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple accesses, e.g. filter-bank multicarrier (FBMC), generalized frequency division multiplexing (GFDM) or universal filtered multi carrier (UFMC), may be used. The wireless communication system may operate, e.g., in accordance with the LTE-Advanced pro standard or the 5G or NR, New Radio, standard.

In the wireless communication network as shown in FIG. 1 the radio access network 104 may be a heterogeneous network including a network of primary cells, each including a primary base station, also referred to as a macro base station. Further, a plurality of secondary base stations, also referred to as small cell base stations, may be provided for each of the macro cells.

In addition to the above described terrestrial wireless network also non-terrestrial wireless communication networks exist. FIG. 2 below is a schematic representation of an example of a non-terrestrial wireless communication network 150 including a core network 152 and a radio access network 154. Other than the terrestrial wireless network of FIG. 1, the non-terrestrial wireless network 150 includes a plurality of spaceborne transceivers 156, like satellites, and/or airborne transceivers 158, like unmanned aircraft systems. The respective spaceborne or airborne transceivers 156, 158 may be implemented in respective spaceborne or airborne vehicles, like the above mentioned satellites or unmanned aircraft systems. The transceivers 156 and 158 are provided to serve one or more users, like the UE or the IoT device 110 shown in FIG. 2, which are provided on or above ground 160. The UE and the IoT device may be devices as described above with reference to FIG. 1. The arrows $\mathbf{158}_1$ to $\mathbf{158}_4$ schematically represent uplink/downlink connections for communicating data between the user UE, 110 and the respective transceiver 156, 158. The transceivers 156, 158 are connected to the core network 152 as is schematically represented by the arrows $\mathbf{162}_1$, $\mathbf{162}_2$. The above described non-terrestrial wireless communication network or system may operate in a similar way as the terrestrial system described above with reference to FIG. 1, for example in accordance with the LTE-advanced pro standard or the 5G or NR, new radio, standard.

It is noted that the information in the above section is only for enhancing the understanding of the background of the invention and therefore it may contain information that does not form conventional technology that is already known to a person of ordinary skill in the art.

Starting from conventional technology as described above, when considering the demand for worldwide connectivity, it seems difficult to cover the entire earth by stationary/terrestrial cellular networks, and therefore, non-stationary networks are needed to support current connectivity demand. That is, the demand for worldwide connectivity is dramatically increasing due to rising number of different services and data demands in a more and more connected world. This also includes connectivity anytime and everywhere. Even if the number of connected areas around the world dramatically increase, it will not be possible to serve every spot on the entire earth, e.g., underserved areas, maritime, planes, and etc. by stationary/terrestrial cellular networks.

In order to support these needs, cellular networks need to be supported by non-stationary (i.e., terrestrial and non-terrestrial, e.g., moving BS on ground and LEO/MEO) and non-terrestrial (i.e., stationary and non-stationary, e.g., GEO and LEO/MEO) networks as well. These networks could consist of e.g., drones, airplanes, high altitude platforms, low earth orbit satellites, and/or medium earth orbit satellites. By adding non-stationary base stations to the networks of the future the coverage and also the reliability could be easily and dramatically enhanced, which would be needed for many future services and applications. In addition, even connectivity between all these different types of platforms will be needed to support the quality of service (QoS) needs and ensure service sustainability, e.g. in disaster relief situations. In the current ongoing 3GPP standardization for 5G, the use of satellites is studied. This includes geostationary Earth orbit (GEO) satellites (non-movable transmission points) as well as non-geostationary Earth orbit (NGEO) or non-geosynchronous orbit (NGSO) satellites (movable transmission points). For the user equipment (UE), two different types of UEs will be taken into account for satellite connectivity depending on the used frequencies. There are currently two different types of frequency ranges defined.

Frequency range 1 (FR1) defines frequencies below 6 GHz

Frequency range 2 (FR2) defines frequencies above 24 GHz. For FR2 the type of

UE for a satellite connection is defined as satellite specific user terminal. For FR2 no standard UE as defined in 3GPP, e.g. UE class 3) will be used.

The above mentioned frequency ranges could be changed or further rages may be added.

In general, satellite specific user terminals are equipped with a dish antenna to reach high signal gains, due to its high directivity. Especially for frequencies in the FR2 and the use of satellite specific user terminals on ground with high directive antennas the problem of in-line interference arises for the service uplink.

Considering the above mentioned scenario in which the UE uses a directive antenna to communicate with a NGSO satellite. It may further be able to track the movement of the NGSO satellite with its antenna. Given the high directivity it is possible that the UE will glare a GEO satellite that is located in the same direction as the NGSO from the UE's perspective. As the uplink transmission power could exceed the regulatory constraints for an in-line interference, this issue should be addressed in the initial and random access phase. In the following, it is assumed that the UE is aware of its position as well as the network.

The problem with a heavy deployment of NGSO systems arises with so-called in-line interference. This type of interference occurs, whenever a NGSO satellite crosses the line of sight path of an Earth station and a GEO satellite as depicted in FIG. 3.

According to the ITU Radio Regulations, the interference to any GEO network caused by a NGSO system is strictly constrained. One restriction to the system is that a NGSO system shall not cause unacceptable interference into any GEO network in the fixed satellite service for uplink in the same frequency (In-line interference), shown in FIG. 3. For that reason, limits the maximum equivalent power flux densities (EPFD) of the NGSO system. In the following, it is focused on the service uplink from the UE to the NGSO system only.

Possibilities for In-Line Interference Management

1. Established Connection:
   a. Reduction of transmit power: If the connection is already established one remedy would be to reduce the transmit power. Commonly, the UE is configured to transmit with the minimum possible transmit power, which meets a certain signal quality constraint. A further reduction of the transmit power would violate these quality constraints.
   b. If the reduction of transmit power is not possible, the release of the existing connection is needed.
2. New Connection:
   a. a new connection is initiated by the random access procedure: The prohibition of random access to the satellite is needed in order to avoid violation of regulatory constraints, i.e. causing in-line interference.

Access Control in 4G/5G

According to the LTE dictionary http://www.sharetechnote.com/html/Handbook_LTE_AccessControl.html:

In LTE, there are two access control types:

Type 1) Accept initial request from UE but Network sends a reject message

Type 2) Prevent UE from trying initial access itself. (This type is called 'Barring')

Case 1: Bar every UE from any type of access even for emergency call (Configured by SIB1)

Case 2: Bar only specific UE (with specific marking in USIM) from a specific service (Configured by SIB2)

Only Type 2, i.e. barring, seems to be appropriate in case of NTN to prevent in-line interference, since Type 1 needs an initial request by the UE.

In 5G, barring information is specified to groups of users depending on an occurring event. These groups are addressed by an access identity, which is implemented in the UE. A set of barring information (UAC-BarringInfoSet) is broadcast from the transmission point that applies the access barring, where the validity of the barring for the group starts from the moment of the broadcast for a duration that is specified by the uac-barringTime.

Additionally, a barring factor specifies the probability of successful access attempt if a new access request is attempt. This barring mechanism is applicable immediately after signalling to the UEs. In satellite case, the barring mechanism is not sufficient.

Open Issues for Access Control

Strong regulatory constraints for in-line interference specify satellites, which are not available for connection establishment. Without knowledge of blocked satellites, the UE might cause in-line interference to another operating system, hence, violating satellite specific regulatory constraints, when transmitting or requesting a connection establishment. This occurs specifically for the UEs equipped with directed antennas.

A specific mechanism for 5G is the so called barring mechanisms of 4G and 5G (4G: TS 36.331, 5G: TS 22.261, TS 38.331, Technical Specification of the European Telecommunications Standards Institute), which applies to user groups. The 5G barring mechanism does not support the access control of one or few specific UEs.

SUMMARY

An embodiment may have a user device, UE, for a wireless communication system, the wireless communication system including a plurality of transmission points for communicating with the user device, UE, wherein the plurality of transmission points includes at least a first transmission point and a second transmission point, at least one of the first and second transmission points is movable relative to the other transmission point, wherein the user device, UE, is configured to communicate with at least one of the transmission points, wherein the user device, UE, is configured to store a list or to receive a signaling indicating a request based on the occurrence of an in-line interference to prevent the UE from transmission to at least one of the first and the second transmission points, and wherein the user device, UE, is configured to control an access to at least one transmission point in case the list or the signaling indicates the request to prevent the UE from transmission responsive to the list or the signaling.

Another embodiment may have a user device, UE, for a wireless communication system, the wireless communication system including a plurality of transmission points for communicating with the user device, UE, wherein the plurality of transmission points includes at least a first transmission point and a second transmission point, at least one of the first and second transmission points is movable relative to the other transmission point, wherein the user device, UE, is configured to communicate with at least one of the transmission points, wherein the user device, UE, is able or configured to avoid selecting a moveable transmission point of the plurality of transmission points for communication based on the occurrence of an in-line interference caused by an expected constellation of the moveable transmission point with respect to an immobile transmission point of the plurality of transmission points and the UE.

Another embodiment may have a transmission point, TP, for a wireless communication system, the wireless communication system including a plurality of transmission points, TPs, and a plurality of user devices, UEs, for communicating with a transmission point, TP, wherein the transmission point, TP, and at least one further transmission point, TP, of the plurality of transmission points, TPs, are movable relative to each other; wherein the transmission point, TP, is configured to communicate with at least one of the user devices, UE, wherein the transmission point, TP, is configured to generate a list and/or a signaling indicating a request to prevent at least one UE from transmission to at least one of the transmission points and the further transmission point; wherein the transmission point, TP, is configured to transmit the list and/or the signaling to the user device, UE, which is in a coverage area of the transmission point, TP.

According to another embodiment, a wireless communication system may have a plurality of inventive user devices, UE, and a plurality of inventive transmission points, TP.

According to another embodiment, a method in a user device for a wireless communication system, the wireless communication system including a plurality of transmission points for communicating with the UE, wherein the plurality of transmission points includes at least a first transmission point and a second transmission point, at least one of the first and second transmission points is movable relative to the other transmission point, may have the steps of: communicating with at least one of the transmission points, storing a list or receiving a signaling indicating the occurrence of an in-line interference of the first and the second transmission points, and controlling an access to the at least one transmission point in case the list or the signaling indicates the occurrence of an in-line interference of the first and the second transmission points.

According to another embodiment, a method in a transmission point for a wireless communication system, the wireless communication system including a plurality of transmission points and a plurality of user devices for communicating with a transmission point, wherein the transmission point and at least one further transmission point of the plurality of transmission points are movable relative to each other, may have the steps of:

communicating with at least one of the user devices, generating a list and/or a signaling indicating the occurrence of an in-line interference of the transmission point and the further transmission point; and transmitting the list and/or the signaling to the user device which is in a tracking area of the transmission point.

Another embodiment may have a non-transitory digital storage medium having a computer program stored thereon to perform any of the inventive methods when said computer program is run by a computer.

The present invention provides a user device (UE) for a wireless communication system is provided, the wireless communication system including a plurality of transmission points [e.g., satellites which are blocked at predetermined time or period to be accessed from the user device (UE) for mitigating in-line interference] for communicating with the user device (UE), wherein the plurality of transmission points includes at least a first transmission point [e.g., GEO: geostationary Earth orbit] and a second transmission point [e.g., NGEO: non-geostationary Earth orbit], at least one of the first and second transmission points is movable relative to the other transmission point. The user device (UE) is configured to communicate with at least one of the transmission points, wherein the user device (UE) is configured to store a list [e.g., blacklist about satellites or antenna direction] or to receive a signaling [e.g., list of blocked UEs] indicating a request to prevent the UE from transmission to at least one of the first and the second transmission points, and wherein the user device (UE) is configured to control an access to the at least one transmission point in case the list or the signaling indicates the request to prevent the UE from transmission responsive to the list or the signaling. [e.g., wait to perform contact request or switch the transmission point to send a contact request, for cell selection and for handover, the interfering transmission points are excluded to access based on the list].

In accordance with embodiments, the list indicates blocked transmission points not to be accessed by the user device (UE) [e.g., blocked satellite list], wherein the list of the blocked transmission points includes identifiers (IDs) of each transmission points associated with validity information of the transmission point, wherein the validity information indicates an access blocking period of the transmission point [e.g., blocked time window]. The blocked transmission points list may further include an expiration date for the list relating to the movement of the movable transmission point.

In accordance with embodiments, the list indicates one or more blocked antenna pointing directions of the user device (UE), wherein the blocked antenna pointing direction list includes position information about a position of the user device (UE) locates [e.g., UE coarse position] and a forbidden pointing direction of a user device antenna for communicating with the transmission point, the forbidden pointing direction corresponding to the position information.

In accordance with embodiments, the blocked antenna pointing direction list [e.g., antenna blacklist] further includes an expiration date for the list relating to the movement of the movable transmission point.

In accordance with embodiments, the user device is configured to receive location information indicating the location of the movable transmission point, and to update the blocked antenna pointing list based on the received location information.

In accordance with embodiments, the user device is configured for receiving information indicating at a position of at least one moveable transmission point, wherein the UE is configured to obtain information indicating its own position and information indicating a position of an immobile transmission point of the plurality of transmission points, wherein the UE is configured to evaluate, if the moveable transmission point is allowed to accessed and to contact to the moveable transmission point dependent on the list.

In accordance with embodiments, the received signaling includes identifiers (IDs) of the user devices (UEs) which are blocked to communicate with the transmission point.

In accordance with embodiments, the user device (UE) is configured to receive and/or store a parameter set for generating the list. The parameter set includes at least one or more of an user device antenna configuration [e.g., antenna orientation, lobe characteristics, beam width], an user device (UE) position [e.g., geographic coordinates, tracking area ID], a first transmission point position [e.g., NGEO, ephemeris data, two-line data], a second transmission point position [e.g., GEO, ephemeris data, two-line data] and an antenna configuration of the first and second transmission points (TPs) [e.g., antenna orientation, lobe characteristics, beam width of NGEO and GEO] [information relating to the satellites is provided from the satellites].

In accordance with embodiments, the UE comprises one or more of

- a mobile terminal, or
- stationary terminal, or
- cellular IoT-UE, or
- vehicular UE, or
- an IoT or narrowband IoT, NB-IoT, device, or
- a ground based vehicle, or
- an aerial vehicle, or
- a drone, or
- a moving base station, or
- road side unit, or
- a building, or
- a stationary base station, or
- a nomadic base station, or
- a moving ground station, or
- a nomadic ground station, or
- a stationary ground station any other item or device provided with network connectivity enabling the item/device to communicate using the wireless communication network [e.g., a sensor or actuator].

In accordance with embodiments, the UE is configured to control an access to the at least one transmission point by not initiating a connection to the transmission point (TP) at least for a time duration indicated in the list.

The present invention further provides a user device (UE) for a wireless communication system, the wireless communication system including a plurality of transmission points [e.g., satellites which are blocked at predetermined time or period to be accessed from the user device (UE) for mitigating in-line interference] for communicating with the user device (UE), wherein the plurality of transmission points includes at least a first transmission point [e.g., GEO: geostationary Earth orbit] and a second transmission point [e.g., NGEO: non-geostationary Earth orbit], at least one of the first and second transmission points is movable relative to the other transmission point. The user device (UE) is configured to communicate with at least one of the transmission points, wherein the user device (UE) is configured to avoid selecting a moveable transmission point of the plurality of transmission points for communication based on an expected constellation of the moveable transmission point with respect to an immobile transmission point of the plurality of transmission points and the UE. [constellation may be such that the moveable TP blocks the immobile TP]

In accordance with embodiments, the user device is configured to determine measurement values or to receive signaling indicative of at least one of:

- a channel quality between the UE and at least one of the transmission points, [e.g., RX signal strength]
- a beginning of an expected blocking of the immobile transmission point by the moveable transmission point,
- a duration of the expected blocking a barred or a permitted angle of an antenna arrangement of the UE information indicating blocked UEs or UEs that are expected to be blocked wherein the UE is configured to avoid selecting the moveable transmission point responsive to the determined measurement value or received signaling.

In accordance with embodiments, the user device comprises an adaptable subscriber identity module (USIM) being implemented to be adapted responsive to a change between a first state in which the UEs transmission to an immobile transmission point is blocked by the moveable transmission point and a second state in which the UEs transmission to the immobile transmission point is unblocked.

In accordance with embodiments, the user device is adapted to transmit a measurement report indicating a link quality [e.g., by use of Reference Signal Receive Power—RSRP] to at least one neighboring cell of the UE [cells are operated by transmission points] wherein the network is adapted to select, for a handover of the UEs communication, a transmission point from the reported at least one neighboring cell, wherein the UE is adapted to exclude the avoided transmission point from the measurement report or to set information relating to the avoided transmission point to a predetermined value associated with the status of being an avoided transmission point.

The present invention provides a transmission point (TP) for a wireless communication system, the wireless communication system including a plurality of transmission points (TPs) and a plurality of user devices (UEs) for communicating with a transmission point (TP), wherein the transmission point (TP) and at least one further transmission point (TP) of the plurality of transmission points (TPs) are movable relative to each other. The transmission point (TP) is configured to communicate with at least one of the user devices (UE). The transmission point (TP) is further configured to generate a list and/or a signaling indicating a request to prevent at least one UE from transmission to at least one of the transmission points and the further transmission point. The transmission point (TP) is configured to transmit the list and/or the signaling to the user device (UE) which is in a tracking area of the transmission point (TP).

In accordance with embodiments, the list indicates blocked transmission points not to be accessed by the user device (UE) [e.g., blocked satellite list], wherein the blocked transmission point list includes identifiers (IDs) of each transmission point associated with a validity information.

In accordance with embodiments, the validity information indicates at least one of: a validity of at least one of the identifiers; access blocking period of the transmission point, and a validity period of the list.

In accordance with embodiments, the transmission point (TP) is configured to transmit location information indicating its own location to the user devices (UEs).

In accordance with embodiments, the transmitted signaling includes identifiers (IDs) of the user devices (UEs) which are blocked to communicate with the transmission point (TP).

In accordance with embodiments, the transmission point (TP) is configured to receive and/or store a parameter set for generating the list and/or signaling. The parameter set includes at least one or more of an user device (UE) antenna configuration [e.g., antenna orientation, lobe characteristics, beam width], an UE position [e.g., geographic coordinates, tracking area ID], a first transmission point position [e.g., NGEO, ephemeris data, two-line data], a second transmission point position [e.g., GEO, ephemeris data, two-line data] and antenna configuration of the transmission point and the further transmission point [e.g., antenna orientation, lobe characteristics, beam width of NGEO and GEO] [information relating to the UE is provided from the UEs].

In accordance with embodiments, the transmission point comprises one or more of a macro cell base station, or
a small cell base station, or
a central unit of a base station, or
a distributed unit of a base station, or
a road side unit, or
a UE, or
a remote radio head, or
an AMF, or
an SMF, or
a core network entity, or
a network slice as in the NR or 5G core context, or
a spaceborne vehicle, like a satellite or a space vehicle at a specific altitude and orbital period or plane, e.g., a low earth orbit (LEO), a medium earth orbit (MEO), a geosynchronous orbit (GSO), a geostationary orbit (GEO), or a high earth orbit (HEO), or
an airborne vehicle, like an unmanned aircraft system (UAS), e.g., a tethered UAS, a lighter than air UAS (LTA), a heavier than air UAS (HTA) and a high altitude UAS platforms (HAPs), or
any transmission/reception point, TRP, enabling an item or a device to communicate using the wireless communication network, the item or device being provided with network connectivity to communicate using the wireless communication network.

The present invention provides a wireless communication system, comprising: a plurality of user devices (UE) according to embodiments, and a plurality of transmission points (TP) according to embodiments.

In accordance with embodiments, the wireless communication system is configured to broadcast a parameter set for generating the list and/or signaling, The parameter set includes at least one or more of an user device (UE) antenna configuration [e.g., antenna orientation, lobe characteristics, beam width], an UE position [e.g., geographic coordinates, tracking area ID], a first transmission point position [e.g., NGEO, ephemeris data, two-line data], a second transmission point position [e.g., GEO, ephemeris data, two-line data] and antenna configuration of the transmission point and the further transmission point [e.g., antenna orientation, lobe characteristics, beam width of NGEO and GEO] [information relating to the UE is provided from the UEs]. The wireless communication system is configured to use one of a System Information Block ($SIB_i$) or a Master Information Block (MIB).

In accordance with embodiments, the wireless communication system is configured to receive, from the UE, measurement reports indicating a link quality [e.g., by use of Reference Signal Receive Power—RSRP] to at least one neighboring cell of the UE [cells are operated by transmission points] wherein the wireless communication system is adapted to select, for a handover of the UEs communication, a transmission point from the reported at least one neighboring cell.

In accordance with embodiments, the wireless communication system includes a terrestrial network, or
a non-terrestrial network, or
networks or segments of networks using as a terminal an airborne vehicle or a spaceborne vehicle, or a combination thereof.

The present invention provides a method in a user device (UE) for a wireless communication system, the wireless communication system including a plurality of transmission points for communicating with the UE, wherein the plurality of transmission points includes at least a first transmission point and a second transmission point, at least one of the first and second transmission points is movable relative to the other transmission point, the method having:

- communicating with at least one of the transmission points,
- storing a list or receiving a signaling indicating the occurrence of an in-line interference of the first and the second transmission points, and
- controlling an access to the at least one transmission point in case the list or the signaling indicates the occurrence of an in-line interference of the first and the second transmission points.

The present invention provides a method in a transmission point (TP) for a wireless communication system, the wireless communication system including a plurality of transmission points (TPs) and a plurality of user devices (UEs) for communicating with a transmission point (TP), wherein the transmission point (TP) and at least one further transmission point (TP) of the plurality of transmission points (TPs) are movable relative to each other; the method having:

- communicating with at least one of the user devices (UEs),
- generating a list and/or a signaling indicating the occurrence of an in-line interference of the transmission point (TP) and the further transmission point (TP); and
- transmitting the list and/or the signaling to the user device (UE) which is in a tracking area of the transmission point (TP).

The present invention provides a non-transitory computer program product comprising a computer readable medium storing instructions which, when executed on a computer, perform the inventive methods.

BRIEF DESCRIPTION OF THE DRAWINGS

Embodiments of the present invention will be detailed subsequently referring to the appended drawings, in which:

FIG. 6 illustrates a schematic diagram representing a transmission point in accordance with embodiments of the present invention;

FIG. 7 illustrates a further example of a list indicating the occurrence of an in-line interference between a movable and a non-movable transmission point in accordance with embodiments of the present invention;

FIG. 8 illustrates an example of a list indicating blocked UE to be connected with the transmission point having the in-line inference in accordance with embodiments od the present invention.

DETAILED DESCRIPTION OF THE INVENTION

Embodiments of the present invention are now described in more detail with reference to the accompanying drawings in which the same or similar elements have the same reference signs assigned. At first, some functions for understanding the present invention are explained.

Figure 1:
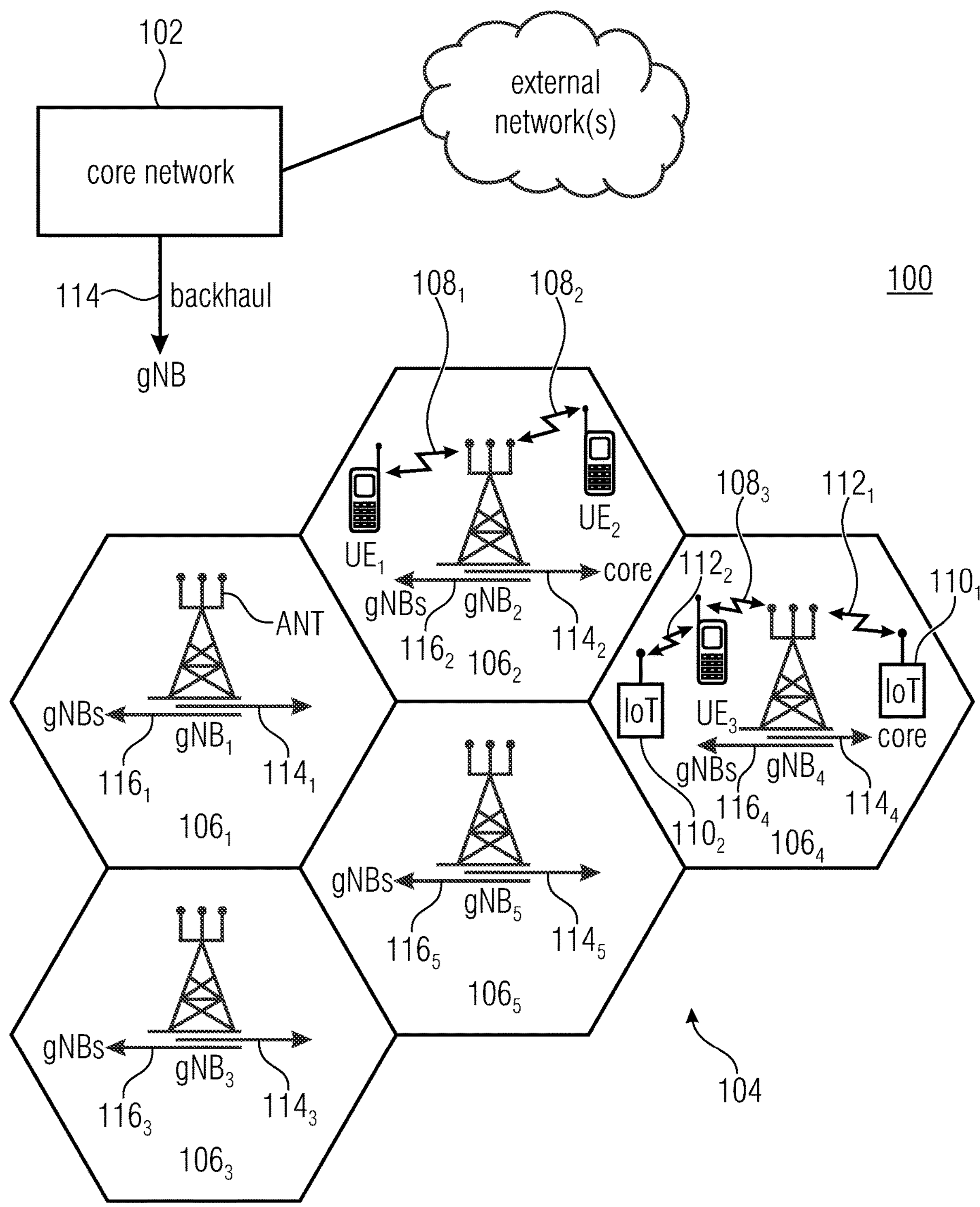
FIG. 1 shows a schematic representation of an example of a wireless communication system.
Figure 2:
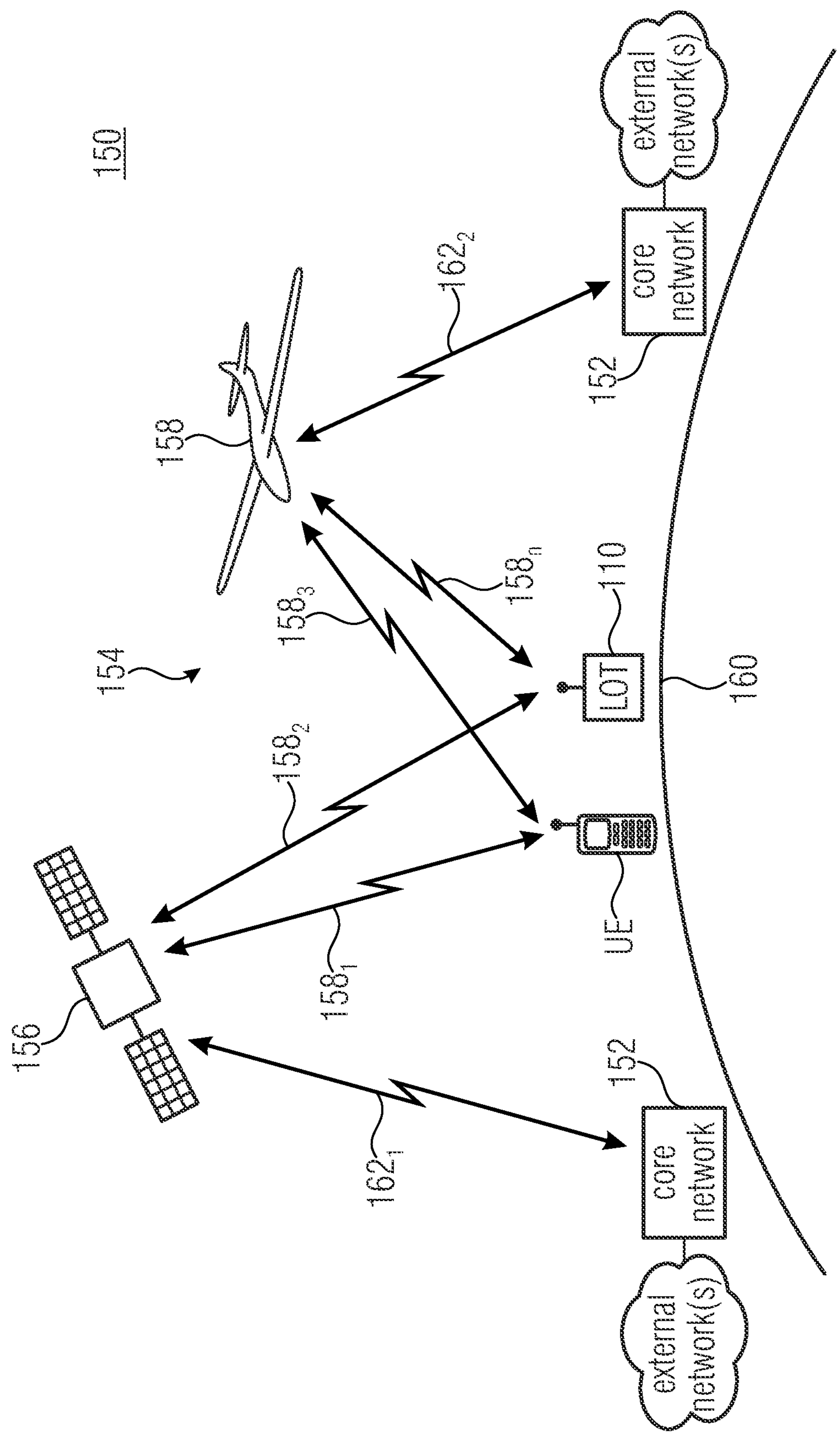
FIG. 2 is a schematic representation of an example of a non-terrestrial wireless communication network including a core network and a radio access network.
Figure 3:
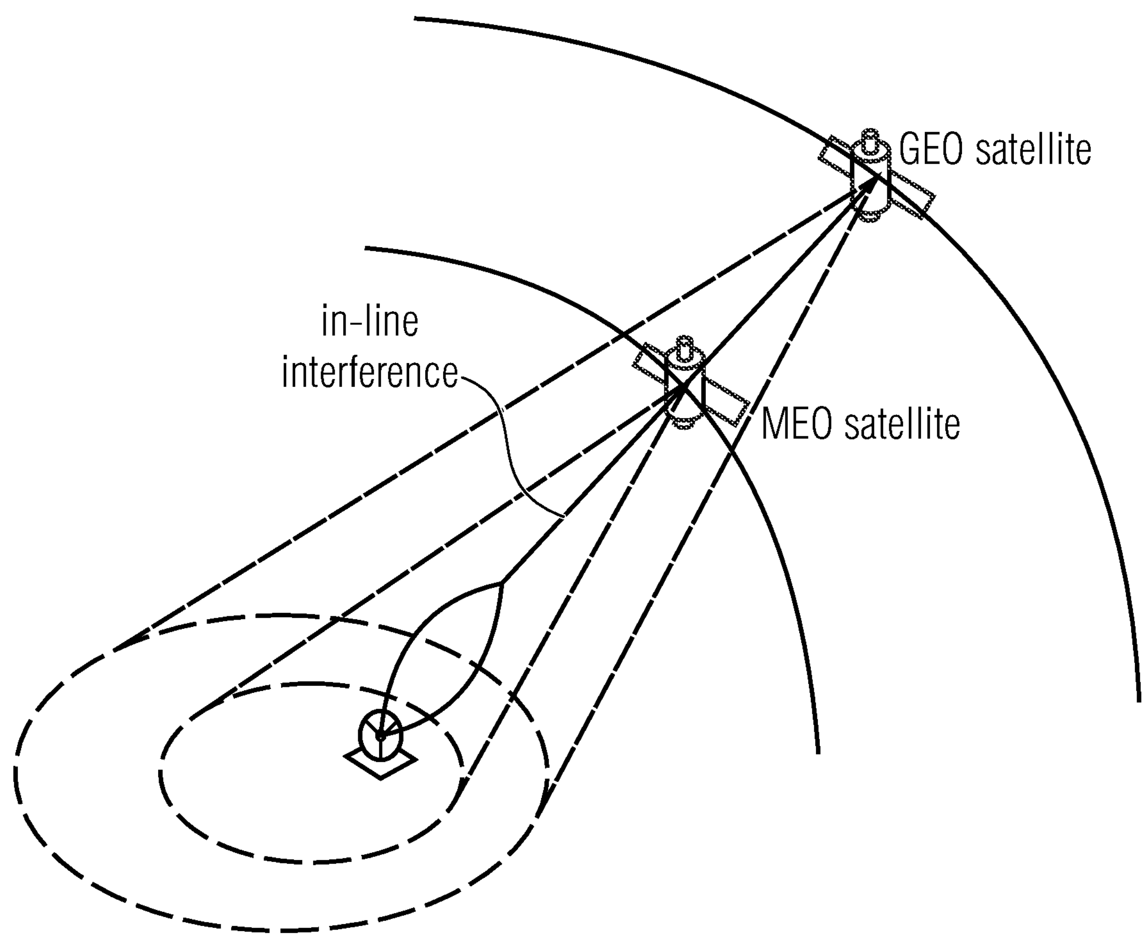
FIG. 3 is a schematic illustration shown an occurrence of an in-line interference between a movable and a non-movable transmission point in accordance with conventional technology.

Firstly, it is focused on the mitigation of an in-line interference as depicted in FIG. 3, whenever a (new) connection to a satellite (i.e. a transmission point) needs to be established. Similar to a concept of blacklists as used for cell selection in the 5G system, a concept of blacklists for satellite selection, which specify the blocked satellites before connection establishment is introduced. Due to the movement of NGSO satellites the proposed blacklist contains also validity information in form of dynamic content, in contrast to "terrestrial" static blacklists. Different to the already implemented blacklisting (which is managed by the CN), this new blacklist is located at the UE and is evaluated prior to a connection establishment.

In the following, the proposed solution is described in the context of the 5G New Radio system, however, the principles can be applied to any other NGSO satellite system for in-line interference mitigation as well. Moreover, the mechanism might serve for any other in satellite communication, where access needs to be restricted case (e.g. IoT applications, where sensors should be restricted to specific BS's). Another possible application scenario is co-channel interference management i.e. whenever a prioritized system needs to be protected from disruption by a secondary satellite system that uses the same radio resource. Specifically, the solution for UE specific blocking as proposed below, can also be applied for access control in terrestrial systems.

UE Specific Access Control Using Blacklists

With knowledge of occurring in-line interference events appropriate actions can be triggered. Depending on the connection mode of the UE, different possibilities are described in the following for blacklists.

Initial Access/Connection Mode: Disconnected:

When the UE is not connected to the system (network), an uncontrolled initial connection request may produce interference. As no blacklisting information are available at the UE prior to initial connection, the broadcast of blacklisting information is needed for this scenario. The blocking information over broadcast is permanently valid unless (temporary) UE specific blocking information is transmitted to the UE. In order to reduce signalling overhead, updates of blocking list(s) shall be also possible to be transmitted, not only the transmission of complete blacklist(s).

Random Access/Connection Mode: RRC_Idle or RRC_Inactive

In RRC_idle or RRC_inactive states, in-line interference arises when random access is performed. If connection establishment to the satellite of choice is blocked, the UE can wait until the blockage time window has passed to initiate the connection. Alternatively, another satellite (transmission point) may be selected.

RRC_Connected Mode

If the UE is in RRC_connected mode, a reduction of the transmit power for interference mitigation is the first action. If the transmit power reduction still leads to an unacceptable link condition, the disconnection from the satellite is needed. In this case handover initiated from the system is needed.

Interference mitigation handover message: the satellite sends a handover/access barring signal with alternative transmission points that are informed and can take over. The signalling can include handover assistance information such as (contention free RACH sequence, ID, sync sequence, expected TA, beam direction, and etc.). There is no handover failed after which the UE reconnects to the source base station. In this case a new initial access is triggered avoiding the barred transmission points.

The UE specific access control allows to address particular UEs to be blocked for random access. This is especially important when blocking and respective actions needs to be performed in an efficient manner, e.g. adaptive blocking, handover. This is realized by making the specific blocking information available to the UE in advance. Hence, the UE specific access control is advantageous but not limited, if connection to the system already exists.

These blacklists may be transmitted either

On application layer, Over-The-Top (OTT)

Extending existing MIB or SIB1 or SIB2.

New System Information Block (SIB), which is requested by a UE

Extended the existing LTE and NR Barring mechanism, which is currently not UE specific:

Use the barring mechanism and transmit the parameters (barring factor, barring time, barring for special access class) together with validity information and IDs of transmission points as a UE specific SIB. The mechanism is similar to the one used for UE groups in below chapter about "extension of the barring mechanism with NTN specific information".

Dedicated Signalling of Dynamic Satellite Blacklist

Figures 4, 5:
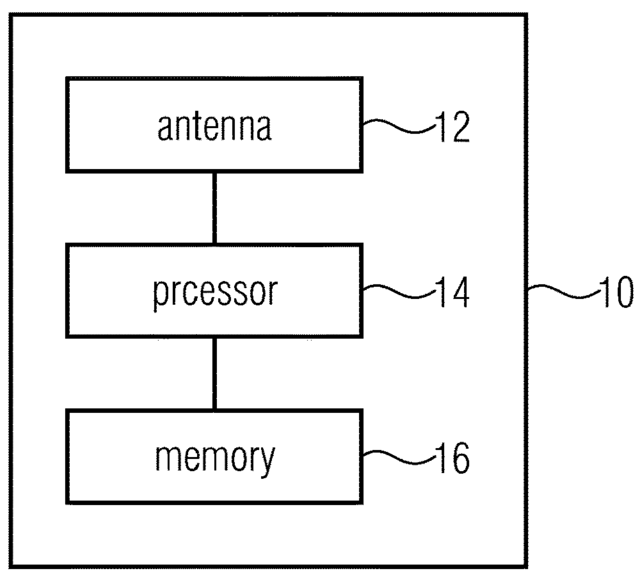
FIG. 4 illustrates an example of a list indicating the occurrence of an in-line interference between a movable and a non-movable transmission point in accordance with embodiments of the present invention.
FIG. 5 illustrates a schematic diagram representing a UE in accordance with embodiments of the present invention.

According to the proposed solution, a dynamic blacklist as sketched in FIG. 4 is available at the UE.

As shown in FIG. 4, the left column of the list contains the IDs of the transmission points, which are subject of the access control, i.e. IDs of satellites or base stations, which are barred. The event of the in-line interference (or generally denied access) is defined by the validity window (right column). The validity window defines the visibility of the ID i.e. it specifies the activity of the ID (also called "entry" in this document) for a window from time step $t_x$ to $t_y$. Within this window the satellite is barred for connection. If no validity information is specified, this corresponds to static content, i.e. the satellite is barred in general. For example, as indicated in FIG. 4, the transmission point having ID 6 has a static content as a validity window, and therefore, the transmission point having ID 6 generally reject an access request. Contrary to the transmission point having ID 6, the transmission point having ID7 rejects an access request within determined time window, i.e., during $t_1$ to $t_2$ and accept the access request other than the determined time window.

To reduce overhead for the transmission of the list, the validity information (information indicating a validity window), which is transmitted, shall be applicable for at least one entry.

For example:

The list may contain static and dynamic content as shown in FIG. 4. So not for all entries, validity information is needed to avoid more signalling overhead.

The validity information may be specified individually, i.e., time window may vary dependent on the position of the UE. Hence, the validity information may be specified for individual UEs.

The entire list may be designed in the RAN/CN and transmitted to the UE (external list) or the list can be generated or at least modified at the UE (internal list). A combination of the internal and external lists is possible as well. For example, information indicating occurrence of the in-line interference between the movable and non-movable transmission points is provided to the UE, and the UE generates the list based on the provided information and its position.

Blocking of satellite and base stations or other transmission points can be handled in separate or in one common list.

When the UE is in RRC_idle or RRC_inactive mode, it might cause a large overhead to update the list. In this case, the list can have a validity as specified above, after which the same procedure as for non-connected UEs is used to decrease in-line interference. Alternatively, a long term not so accurate list can be used that is updated when switching to RRC_connected.

In case of mobility the procedure for RRC_idle/RRC_inactive apply, a blacklist, i.e., signalling indicating an occurrence of an in-line interference between the movable and non-movable transmission points, which describes forbidden antenna pointing directions may be signalled to the UE as explained below. In the latter section of this document, options for the internal list design are given.

Pre-Defined Functions for Deterministic Entry Changes

This option is especially suited for but not limited to cases without or very low mobility of the UEs. In this case in-line interference depends only on the movement of the satellite with a deterministic trajectory. Thus, the in-line interference event can be described by a function and a set of parameters describing the satellite movement, UE position, antenna configuration of satellite and UE. Hence the set of parameters for initialization of the function, may include the following:

UE antenna configuration: orientation, lobe characteristics, beam width

UE position: geographic coordinates, tracking area IDs

NGSO satellite position: ephemeris data, two-line data

GSO satellite position: ephemeris data, two-line data

Satellite antenna configuration: orientation, lobe characteristics, beam width

FIG. 5 is a schematic block diagram representing a UE 10 used for a wireless communication system in accordance with the present invention. As shown in FIG. 5, the UE 10 comprising an antenna 12 for sending/receiving signals, a processor 14 for processing signal and control accesses to the transmission points, and a memory 16 for storing the parameters and generated or received list.

In addition, FIG. 6 is a schematic block diagram representing a transmission point (satellite) 20 used for a wireless communication system in accordance with the present invention. As shown in FIG. 6, the transmission point 20 comprising an antenna 22 for sending/receiving signals, a processor 24 for processing signal and a memory 26 for storing the parameters and generated list.

A set of functions may be predefined and known to network and UEs, which are used to generate the entries of the list for the validity periods and periodicity information based (amongst others) on a set of parameters including the parameters given above. If a set of parameters is transmitted to the satellite (transmission point) in form of a list, the list may also contain validity information for the entries. The specifications for the validity information as mentioned above for the satellite blacklist also apply for the list of parameters. Further an expiration date for the entire list may optionally be added.

Note, that UE un-specific parameters such as GSO and NGSO position may also be made available to the UE by broadcast, which reduces signalling. As an example, all NGSO satellites along one orbital plane get successive cell-IDs and are all barred successively for the same time period. In this case, the transmission of the function parameters to generate satellite IDs and/or validity periods are transmitted only once to the UE, instead of all individual list entries. The UE in this case automatically updates its blacklist according to the function(s).

Circular List

If the barring event (blocking/rejecting access request from the UEs) can be described periodically, that transmission of relevant parameters can be done in form of a circular buffer/list/register. This circular list is transmitted once to the UE (and the list is stored into the memory 16), where the relevant content is incrementally read out from the circular list at specific time instances. The entries of the circular list may be used for generation of the blacklist at the UE. For example, the outputs of the list may be inserted directly into the blacklist or it may be used as parameter for some predefined functions. The circular list contains entries with dependencies on periodical repetition (e.g. re-occurring NGSO satellites). Note, that the increment (step size) may be defined by the number of list entries to be read out at one time instance. Hence, for the use of a circular list, the transmission of a clock period and the step size are needed.

For updating satellite IDs (entries) in the blacklist, the circular list shall be designed with individual validity information for each entry (to enable different validity time lengths of the entries) or for a common "clock" period of time for each entry.

Dedicated Signalling of Forbidden Pointing Directions

Alternatively, if the UE knows its own position on a coarse level (e.g. on tracking area level, but not necessarily by GNSS), a list may be configured with forbidden antenna pointing direction(s) as shown in FIG. 7.

The entries of the first columns in FIG. 7 reflect the UE coarse position (which may vary over time due to mobility) and specify the area where the blocked pointing directions (second column) apply, respectively. In the exemplarily table of FIG. 7, for example, direction #al is the forbidden direction (e.g. azimuth and elevation) for area "a" and "satellite 1".

Broadcast of Static UE Blacklist

When the network keeps track of the users, blacklisting can be done by temporarily broadcasting the IDs of the blocked UEs, which are not allowed to perform a connection request (static UE blacklist). The static list (static UE blacklist) is broadcast/signalled (e.g. by an extension of SIB1) by satellite or another transmission point. Blocking for the UE is assumed to be removed when not containing the own ID. This solution assumes, that the UE's positions are known to the network, otherwise network cannot identify the UEs to be blocked.

For the static list design, several options are possible:

1. The static UE blacklist is transmitted to and forwarded as is by the satellite.
2. The static UE (e.g., blocked UE) is derived from a dynamic blacklist, which is available at the satellite (transparent and non-transparent=processed).
3. The satellite with processed payload generates the UE blacklist.

For case 2 and 3 the principles of circular lists, predefined functions as discussed above apply. In contrast to the satellite blacklist (for example, as shown in FIG. 4), the UE blacklist contains the IDs of UEs, which are not permitted to establish connection to the satellite (for example, as shown in FIG. 8).

Case 2: A dynamic UE blacklist with validity information (i.e., dynamic content) is available at the satellite. The validity information defines the time period, when the respective ID needs to be broadcast in the static UE blacklist. The dynamic blacklist can be transmitted to and/or generated and modified by the satellite.

Case 3: In contrast to 2, the satellite collects the output of a predefined function or a circular list at given time instances (clock) to generate the static list. Since the UE blacklist may contain many UEs, a piece-wise transmission of the blacklist shall be possible as well. To give an example, Ka-Band 30 GHz and 30 cm dish antenna results in a −3 dB beam width of 3.8°. With a LEO height of 500 km, the area which has to be blacklisted, is <<35 km (that's for −3 dB antenna gain, but more is needed to fulfil regulatory requirements).

Signalling of the UE capabilities (via NR RRC layer specified in TS 38.331) is needed as well, since the network has to know the approximate beam pattern to estimate, whether the UE's uplink would be harmful or not, i.e., the UE's uplink is to the transmission point having the in-line interference or not.

Broadcast of GEO Satellite Locations

In the following, it is assumed that the UE is aware of its antenna pointing direction. If the UE knows its location as well as the locations of all GEO satellites in its field of view, it could calculate all forbidden pointing directions by itself and possibly initiate a cell/satellite reselection before its antenna pointing direction comes close to a forbidden pointing direction or simply interrupt the connection.

In order to prevent that the UE uses an outdated list of GEO satellite locations, this list may have an expiration date. To limit signalling overhead, transmission of an update of a part of the list or extension shall be possible. The GEO satellite locations could be distributed towards the UE by any kind of broadcast channel or on demand using another communication link.

Broadcast of Forbidden Pointing Directions

In the following, it is assumed that the UE is aware of its antenna pointing direction and its antenna characteristics such as antenna pattern. The LEO/MEO satellites could broadcast pointing directions that are prohibited to use by UEs with highly directive antennas, e.g. dish antennas. These pointing directions only restrict the uplink towards the respective LEO/MEO satellite and would need to be regularly updated depending on the NGSO satellite location. This information is therefore LEO/MEO satellite (movable transmission point) specific.

Broadcast of Information in 5G

The broadcast of the above mentioned parameters may be done in the MIB, SIB1, SIB2 or new SIB specific for NTN (explained below).

New Optional Satellite Information Block (New SIB or Extended Existing SIB)

The UE determined GSO Access during Cell Selection Procedure based on NGSO/GSO position. An alternative approach to enable the UE to determine any possible in-line interference between the GSO (non-movable transmission point) and NGSO (movable transmission point) satellite is to transmit the current NGSO position as well as, optionally, also the GSO position.

This solution is assumed that the UE is aware of its own current position using e.g. GNSS and/or network (WLAN/cellular) specific measurement information. Note, this solution should work for also for mobile UEs.

The UE can derive the in-line interference from a combination of:

its own current UE position, the current NGSO position and the GSO position.

Based on an MIB flag or UE type or anything else, the UE is aware that the elected transmission point to be validated is needing satellite communication. Then, the UE has to read/decode the SystemInformationBlockType1 (SIB1). A new satellite information block should be added to SIB1 or alternatively to any other existing or new System Information Message.

The new optional satellite information block e.g. in SIB1 could for example look like:

```
satInfo                        SEQUENCE {
ngso-Position (s)              NGSO-Position(s) OPTIONAL,
ngso-MovingDirection (s)       NGSO-MovingDirection(s) OPTIONAL,
gso-Position (s)               GSO-Position OPTIONAL, -- currently
                               closest GSO(s) to NGSO
```

Other satellite specific parameters/information to be added as:

} OPTIONAL

} OPTIONAL,

The satellite should only be added in case of a NGSO as a transmission point. For a GSO as a transmission point, either no or an adapter information block is needed.

As the GSO position is fixed, the UE may be aware of it in advance. Then, there would be no need to add it to "satInfo".

During the cell selection/validation procedure, the UE should then perform to 1. read the MIB
2. read the satellite information block in SIB1 (or any other system information block)
3. calculate during the cell validation procedure, whether this NGSO transmission point is currently allowed to be accessed.

Further improvements could be that the UE is configured to:

1. calculate the time offset until when accessing this NGSO transmission point can be accessed without causing inline interference, and/or
2. consider the moving direction of the satellite and the UE for future access.

Enhanced NTN Specific Cell Selection Procedure

Extending the 5G Cell Access Blocking Mechanism

Modification of CellSelectionInfo Block in NR SIB1

Alternative to the blacklisting procedure described in the above, avoiding the selection of a defined cell/satellite during a given satellite constellation by a UE, the Cell Selection Procedure can be enhanced.

The Cell Selection procedures is based on the Radio Resource Control (RRC) protocol and selects the appropriate cell(s) for UE(s) to camp on/establish connection parameters (see TS 38.331). The cell section is based on a set of measurements and parameters considering e.g. the RX signal strength and quality, which allow accessing the cell. Blocking related information may be included in the in SIB1 cellSelectionInfo block. Additional new satellite specific parameters to be included are:

- Beginning of applicability: time instance when the blocking starts
- The duration of the blocking can be specified in different ways:
  - Blocking time predefined as for terrestrial applications (for example uac-barringTime) so far. For NGSO systems these blocked periods may be adapted e.g. longer blocking duration for few seconds.
  - Blocked time specific for the UE group according to its location and antenna pattern/beam width including side lobes.
  - Ending of applicability: if no duration is signalled, a specific time instance for the end of blocking can be defined.
- Additionally, UE related information may be included:
- Barred or permitted angles of the antenna.
- Blocked UE groups. The groups are defined by a specific marking in the UE, e.g. also on an adaptable USIM (universal subscribed identity module). The update of the marking is triggered by the network. For this purpose, UE with adaptable USIM are needed.

Cell Access Blocking During Cell Selection Procedure

Similar to avoiding the selection of defined cell using blacklist in the UE, an in-line interference causing NGSO transmission point could be identified during the Cell Selection Procedure. Then, this NGSO transmission point would be restricted from access. Cell Selection is performed via the RRC protocol using (pre-)defined parameter values to allow/restrict access to cell. The existing cell selection procedure could be adapted to restrict access to NGSO cell causing in-line interference with GSO satellites.

Extract of the Cell Selection procedure (RRC):

- Cell Search (PSS and SSS)—RRC asks PHY
  - UE PHY scans the UE supported frequencies and reports the cells allowed to access
  - results are reported to UE RRC
    - e.g. Cell IDs and the Cell specific power values (RSRP, RSRQ).
- UE RRC will select the most appropriate cell from the list
- UE initiates Cell Validation Procedure
  - Decode/store MIB
    - IF cellBarred=barred 4 STOP
    - OTHERWISE continue processing
  - Decode/store SIB1 (System Information Block Type1) using parameters provided by MIB
- Add an indication whether the network allows SAT access or not (in conventional technology, there is a spare bit in the NR MIB)
  - If SAT access is allowed, an additional optional satellite specific block has to be received and decoded from the UE e.g. from SIB1 prior to accessing the NGSO cell
  - More details about the satellite specific block are given in the below explanation.

Regarding the satellite specific block, the following calculations are preformed (LTE; adaptations for NR are assumed to be needed).

The prerequisite of restricting access to the NGSO cell for a defined period is that the UE is aware this selected transmission point to be validated is currently causing in-line interference. Based on this knowledge, parameter and/or measurement values needed during the cell selection/ validation procedure values can be adapted/manipulated in a way that the access is denied.

The cell selection criterion S is fulfilled when (Srxlev >0) AND (Squal >0)

where:

Srxlev=Qrxlevmeas−(Qrxlevmin+Qrxlevminoffset)−Pcompensation

Squal=Qqualmeas−(Qqualmin+Qqualminoffset)

where:

Srxlev Cell selection RX level value (dB)

Qrxlevmeas Measured cell RX level value (RSRP)

Qrxlevmin Minimum needed RX level in the cell dBm)

Qrxlevminoffset Offset to the signalled Qrxlevmin taken into account in the Srxlev evaluation as a result of a periodic search for a higher priority PLMN while camped normally in a VPLMN Then, a new satellite/NGSO PLMN could be introduced for all NGSO being used as transmission point Possible adaptation of parameter values used during the cell selection/validation procedure to restrict UEs from accessing possible in-line interference causing NGSO values can be:

Set Srxlev of NGSO interference causing transmission point to e.g. 0

Increase Qrxlevmin to a value, which cannot be exceeded

Qrxlevminoffset: a new satellite/NGSO PLMN could be introduced:

The selection of the sat. transmission point is only allowed if no terrestrial cell is currently accessible.

For NGSO transmission point to be temporarily restricted from being accessed: increase the value of this offset.

This should be clear for the skilled person based on the knowledge about NR: TS 38.331 and LTE: TS 36.331.

To avoid handover to interfering satellite gNBs, the following approach applies:

To enable the network to decide on the need and the best fitting cell for handover, the UE sends periodically measurement reports to the gNB. This measurement report includes the neighbour cells with strongest RSRP as received by the UE based on which the network initiates the handover procedure and selects the best fitting cell for handover. In addition, to avoid handover to interfering satellite gNBs, the UE can temporarily (as long as the in-line interference is experienced) exclude exactly this interfering satellite gNB from the measurement report. Then the network should not consider this interfering satellite gNB for handover.

When the in-line interference is no longer experienced by the UE, the UE should consider/include this satellite gNB in the measurement report, if this satellite gNB is still appropriate (strong enough RSRP).

Extension of the Barring Mechanism with NTN Specified Information

A specific extension for 5G is to use and extend the existing (similar) barring mechanisms of 4G and 5G [4G: TS 36.331, 5G: TS 22.261, TS 38.331]. This approach is proposed for but not limited to initial access.

In 5G, barring information is specified to groups of users depending on an occurring event. These groups are addressed by an access identifier, which is implemented in the UE. A set of barring information (UAC-BarringInfoSet) is broadcast from the transmission point in SIB1, which applies the access barring. The validity of the barring for the group starts from the moment of the broadcast for a duration of the specified by the uac-barringTime. Additionally, a barring factor specifies the probability of successful access attempt if a new access request is attempt.

For the in-line interference mitigation, a specific extension for 5G is to use and extend the existing (similar) barring mechanisms of 4G and 5G (see, Technical Specification, 4G: TS 36.331, 5G: TS 22.261, TS 38.331). New parameters are needed in MIB, SIB1 and SIB2, which is transmitted from the network to the UEs. MIB, SIB1 and SIB2 are not UE specific.

New parameters need to be broadcast to the UE groups additionally as a separate list and/or as an extension for the list of existing parameters (uac-barringFactor, uac-barringTime, and uac-Barring ForAccessIdentity).

Additional validity information as described above in the section of Connection Modes may be attached to the list. Furthermore, new satellite related access identifiers (and access categories if needed) need to be introduced based on the location of the UE position.

Extension of the Serving Cell Configuration for Alternative Connections

Barring/Blocking related information may be included in to the ServingCellConfigCommonSIB, which affects the Random Access (RA) procedure.

1) RA may be blocked by introducing additional rach-ConfigGeneric Parameters, e.g.

Forbidden sub-bands and/or Band Width Parts (BWP), which may disrupt the GSO system Optionally timing information for the forbidden sub-bands and/or BWP. The lack of timing information implies permanent blocking of the sub-band and/or BWP.

Additionally, the response window after RA request ra-ResponseWindow needs to be adapted for satellite connections.

2) Alternative sub-bands and/or BWP for random access may be specified e.g. by identifying an additional uplink channel in the ServingCellConfigCommonSIB/supplementaryUplink Assessment of the Invention Benefits of the Invention The proposed solution ensures the compliance of the 5G system with satellite related regulatory aspects for in-line interference. The mechanism can also be applied to the 5G terrestrial system as efficient alternative to the SotA (State of the Art) access control in 5G. It enables the controlling of a specific UE, which is not possible so far in 5G. The invention can be proven by checking the signalling traffic.

Although some aspects of the described concept have been described in the context of a system, it is clear that these aspects also represent a description of the corresponding method, where a block or a device corresponds to a method step or a feature of a method step. Analogously, aspects described in the context of a method step also represent a description of a corresponding block or item or feature of a corresponding apparatus. In addition, the above explained solution using the blacklist is also applicable for other cases, for example, in case the occurrence of the in-line interference between the moving transmission points, or between the terrestrial transmission point and the non-terrestrial transmission point, or between the stationary transmission point and the non-stationary transmission point.

Figure 9:
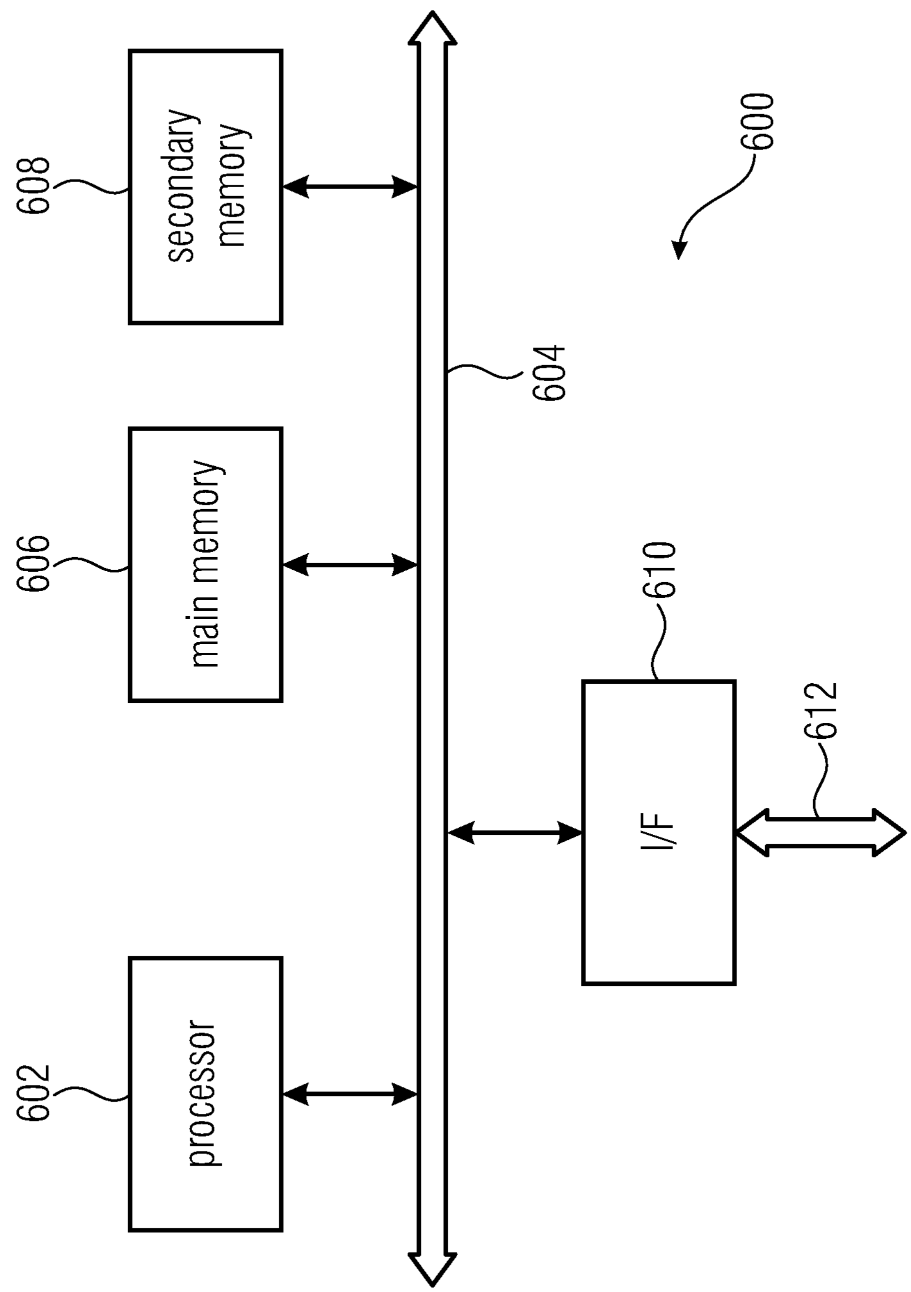
FIG. 9 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. The figure below illustrates an example of a computer system 600 as shown in FIG. 9.

The units or modules as well as the steps of the methods performed by these units may execute on one or more computer systems 600. The computer system 600 includes one or more processors 602, like a special purpose or a general purpose digital signal processor.

The processor 602 is connected to a communication infrastructure 604, like a bus or a network. The computer system 600 includes a main memory 606, e.g., a random access memory (RAM), and a secondary memory 608, e.g., a hard disk drive and/or a removable storage drive. The secondary memory 608 may allow computer programs or other instructions to be loaded into the computer system 600. The computer system 600 may further include a communications interface 610 to allow software and data to be transferred between computer system 600 and external devices. The communication may be in the form electronic, electromagnetic, optical, or other signals capable of being handled by a communications interface. The communication may use a wire or a cable, fiber optics, a phone line, a cellular phone link, an RF link and other communications channels 612.

The terms "computer program medium" and "computer readable medium" are used to generally refer to tangible storage media such as removable storage units or a hard disk installed in a hard disk drive. These computer program products are means for providing software to the computer system 600. The computer programs, also referred to as computer control logic, are stored in main memory 606 and/or secondary memory 608. Computer programs may also be received via the communications interface 610. The computer program, when executed, enables the computer system 600 to implement the present invention. In particular, the computer program, when executed, enables processor 602 to implement the processes of the present invention, such as any of the methods described herein. Accordingly, such a computer program may represent a controller of the computer system 600. Where the disclosure is implemented using software, the software may be stored in a computer program product and loaded into computer system 600 using a removable storage drive, an interface, like communications interface 610.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A user device for a wireless communication system, the wireless communication system comprising transmission points of a plurality of transmission points for communicating with the user device wherein the plurality of transmission points comprises at least a first transmission point and a second transmission point, at least one of the first and second transmission points is a movable transmission point which is movable relative to other transmission point of the first and second transmissions points, wherein the user device is configured to communicate with at least one of the transmission points, wherein the user device is configured to store a list or to receive a signaling, the list or the signaling indicating a request based on an occurrence of an in-line interference to prevent the user device from transmission to the at least one of the first and the second transmission points, and wherein the user device is configured to control an access to at least one transmission point in case the list or the signaling indicate the request to prevent the user device from transmission responsive to the list or the signaling; wherein the user device is prevented, as indicated in the list or the signaling, to handover to a neighboring cell of the user device where the at least one transmission point belongs to.

2. The user device according to claim 1, wherein the list indicates blocked transmission points not to be accessed by the user device, wherein the list of the blocked transmission points comprises identifiers of each blocked transmission point associated with validity information of the blocked transmission point, wherein the validity information indicates an access blocking period of the blocked transmission point.

3. The user device according to claim 2, wherein the list of the blocked transmission points further comprises an expiration date for the list relating to a movement of the movable transmission point.

4. The user device according to claim 1, wherein the list includes a blocked antenna pointing direction list indicating one or more blocked antenna pointing directions of the user device, wherein the blocked antenna pointing direction list comprises position information of the user device and a forbidden pointing direction of a user device antenna for communicating with the blocked transmission point, the forbidden pointing direction corresponding to the position information.

5. The user device according to claim 4, wherein the blocked antenna pointing direction list further comprises an expiration date for the list relating to a movement of the movable transmission point.

6. The user device according to claim 4, wherein the user device is configured to receive location information indicating a location of the movable transmission point, and to update the blocked antenna pointing list based on the received location information.

7. The user device of claim 1, wherein the user device is configured for receiving information indicating a position of at least one moveable transmission point, wherein the user device is configured to acquire information indicating its own position and information indicating a position of an immobile transmission point of the plurality of transmission points, wherein the user device is configured to evaluate, if the moveable transmission point is allowed to be accessed and to contact to the moveable transmission point dependent on the list.

8. The user device according to claim 1, wherein the received signaling comprises identifiers of user devices, UEs, which are blocked to communicate with the blocked transmission point.

9. The user device according to claim 1, wherein the user device is configured to receive or store a parameter set for generating the list, wherein the parameter set comprises at least one or more of a user device antenna configuration, a user device position, a first transmission point position, a second transmission point position and an antenna configuration of the first and second transmission points.

10. The user device according to claim 1, wherein the user device comprises one or more of:

a mobile terminal, or
stationary terminal, or
cellular IoT-user device, or
vehicular user device, or
an IoT or narrowband IoT, NB-IoT, device, or
a ground based vehicle, or
an aerial vehicle, or
a drone, or
a moving base station, or
road side unit, or
a building, or
a stationary base station, or
a nomadic base station, or
a moving ground station, or
a nomadic ground station, or
a stationary ground station, or
any other item or device provided with network connectivity enabling the item or the device to communicate using the wireless communication system.

11. The user device according to claim 1, wherein the user device is configured to control an access to at least one transmission point by not initiating a connection to the at least one transmission point at least for a time duration indicated in the list.

12. The user device of claim 1, wherein the user device is adapted to prevent the access to the at least one transmission point by manipulating a parameter or a measurement value to be reported to the wireless communication system for accessing the at least one transmission point such that the manipulated parameter or measurement value cause the wireless communication system to deny the access of the user device.

13. The user device of claim 12, wherein the user device is adapted to manipulate at least one of:

a cell selection reception level value;
a Minimum needed received signal level in a cell,
an offset value related to the minimum needed received signal level, so as to introduce an additional or a new transmission point or non-geosynchronous orbit public land mobile network.

14. The user device of claim 13, wherein the user device is adapted to manipulate the offset value related to the minimum needed level to introduce an additional or a new transmission point or non-geosynchronous orbit public land mobile network, and wherein a cell selection of the user device is allowed only if no terrestrial cell is currently available; or wherein the user device is adapted to increase the offset value so as to exclude the additional or the new transmission point or non-geosynchronous orbit public land network.

15. The user device of claim 1, wherein the user device is adapted to implement a device specific barring mechanism.

16. A user device for a wireless communication system, the wireless communication system comprising transmission points of a plurality of transmission points for communicating with the user device, wherein the plurality of transmission points comprises at least a first transmission point and a second transmission point, at least one of the first and second transmission points is a moveable transmission point which is movable relative to the other transmission point of the first and second transmissions points, wherein the user device is configured to communicate with at least one of the transmission points, wherein the user device is able or configured to avoid selecting a moveable transmission point of the plurality of transmission points for communication based on an occurrence of an in-line interference caused by an expected constellation of the moveable transmission point with respect to an immobile transmission point of the plurality of transmission points and the user device;

wherein the user device is adapted to transmit a measurement report indicating a link quality to at least one neighboring cell of the user device, wherein the wireless communication system is adapted to select, for a handover of the user device, a transmission point from a reported at least one neighboring cell, wherein the user device is adapted to exclude an avoided transmission point from the measurement report or to set information relating to the avoided transmission point to a predetermined value associated with a status of being an avoided transmission point.

17. The user device of claim 16, wherein the user device is configured to determine measurement value or to receive signaling indicative of at least one of:

a channel quality between the user device and at least one of the transmission points, a beginning of an expected blocking of the immobile transmission point by the moveable transmission point, a duration of the expected blocking, a barred or a permitted antenna direction from user device perspective, information indicating blocked user devices or user devices that are expected to be blocked, wherein the user device is able or configured to avoid selecting the moveable transmission point responsive to the determined measurement value or received signaling.

18. The user device of claim 16, wherein the user device comprises an adaptable subscriber identity module being implemented to be adapted responsive to a change between a first state in which user devices transmission to an immobile transmission point is blocked by the moveable transmission point and a second state in which the user devices transmission to the immobile transmission point is unblocked.

19. A transmission point for a wireless communication system, the wireless communication system comprising a plurality of transmission points and a plurality of user devices for communicating with a transmission point of the plurality of transmission point, wherein the transmission point and at least one further transmission point of the plurality of transmission points are movable relative to each other;

wherein the transmission point is configured to communicate with at least one user device of the plurality of user devices, wherein the transmission point is configured to generate a list or a signaling, the list or the signaling indicating a request to prevent at least one user device of the plurality of user devices from transmission to at least one of the transmission points and the further transmission point;

wherein the transmission point is configured to transmit the list or the signaling to the user device which is in a coverage area of the transmission point: wherein the user device is prevented, as indicated in the list or the signaling, to handover to a neighboring cell of the user device where the at least one transmission point belongs to.

20. The transmission point according to claim 19, wherein the list indicates blocked transmission points not to be accessed by the user device, UE, of the plurality of user devices, wherein the list indicating the blocked transmission point list comprises identifiers, IDs, of each transmission point associated with a validity information.

21. The transmission point according to claim 20, wherein the validity information indicates at least one of:

a validity of at least one of the identifiers, access blocking period of the transmission point, and a validity period of the list.

22. The transmission point according to claim 19, wherein the transmission point, TP, is configured to transmit location information indicating its own location to the plurality of user devices, UEs.

23. The transmission point according to claim 19, wherein the signaling transmitted comprises identifiers of the user devices which are blocked to communicate with the transmission point.

24. The transmission point according to claim 19, wherein the transmission point, TP, is configured to receive and/or store a parameter set for generating the list and/or signaling, wherein the parameter set comprises at least one or more of a user device, UE, antenna configuration, a UE position, a first transmission point position, a second transmission point position and antenna configuration of the transmission point and the further transmission point.

25. The transmission point according to claim 19, wherein the transmission point comprises one or more of:

a macro cell base station, or a small cell base station, or a central unit of a base station, or a distributed unit of a base station, or a road side unit, or a UE, or a remote radio head, or an AMF, or an SMF, or a core network entity, or a network slice as in the NR or 5G core context, or a gateway/ground station, or a spaceborne vehicle, including, a satellite or a space vehicle at a specific altitude and orbital period or plane, or an airborne vehicle including, an unmanned aircraft system or any transmission/reception point enabling an item or a device to communicate using the wireless communication network, the item or device being provided with network connectivity to communicate using a terrestrial and non-terrestrial wireless communication network.

26. A wireless communication system comprising:

a plurality of user devices for the wireless communication system, the wireless communication system comprising transmission points of a plurality of transmission points for communicating with a user device of the plurality of user devices, wherein the plurality of transmission points comprises at least a first transmission point and a second transmission point, at least one of the first and second transmission points is a movable transmission point which is relative to the other transmission point of the first and second transmission points, wherein the user device is configured to communicate with at least one of the transmission points, wherein the user device is configured to store a first list or to receive a first signaling, the first list or the first signaling indicating a request based on an occurrence of an in-line interference to prevent the user device from transmission to at least one of the first and the second transmission points, and wherein the user device is configured to control an access to at least one transmission point in case the list or the signaling indicates the request to prevent the user device from transmission responsive to the list or the signaling, and the plurality of transmission points for the wireless communication system, the wireless communication system comprising the plurality of transmission points and the plurality of user devices for communicating with a transmission point of the plurality of transmission points, wherein the transmission point and at least one further transmission point of the plurality of transmission points are movable relative to each other;

wherein the transmission point is configured to communicate with at least one of the user devices, wherein the transmission point is configured to generate a second list or a second signaling, the second list or the second signaling indicating a second request to prevent the at least one user device from transmission to the at least one of the transmission points and the further transmission point;

wherein the transmission point is configured to transmit the second list or the second signaling to the user device which is in a coverage area of the transmission point:

wherein the user device is prevented, as indicated in the list or the signaling, to handover to a neighboring cell of the user device where the at least one transmission point belongs to.

27. The wireless communication system according to claim 26, wherein the transmission point, TP, is configured to broadcast a parameter set for generating the list and/or signaling, wherein the parameter set comprises at least one or more of a user device, UE, antenna configuration, a UE position, a first transmission point position, a second transmission point position and antenna configuration of the transmission point and the further transmission point, wherein the transmission point, TP, is configured to use one of a System Information Block, SIBi, or a Master Information Block, MIB.

28. The wireless communication system of claim 26, wherein the transmission point, TP, is configured to receive, from the user device, UE, measurement reports indicating a link quality to at least one neighboring cell of the user device, UE wherein the transmission point, TP is adapted to select, for a handover of the UEs communication, a transmission point from the at least one neighboring cell.

29. The wireless communication system according to claim 26, wherein the wireless communication system comprises a terrestrial network, or a non-terrestrial network, or networks or segments of networks using as a terminal an airborne vehicle or a spaceborne vehicle, or a combination of the terrestrial network, a non-terrestrial network, and networks or segments of networks using as a terminal an airborne vehicle or a spaceborne vehicle.

30. The wireless communication system according to claim 26, wherein the user device, UE, is adapted to implement a device specific barring mechanism specific for an individual user device.

31. The wireless communication system according to claim 30, wherein the transmission point is adapted to transmit, to an individual user device, a barring information comprising at least one of:

a device specific barring factor;

a device specific barring time; and a device specific information which transmission point is allowed for access.

32. The wireless communication system according to claim 31, wherein the transmission point, TP, is adapted to transmit a barring parameter as part of a list comprising other parameters; or as a separate list.

33. The wireless communication system according to claim 31, wherein the user device, UE, is adapted to associate a barring parameter with a validity information and/or with a location information of the user device, UE.

34. A method in a user device for a wireless communication system, the wireless communication system comprising a plurality of transmission points for communicating with the user device, wherein the plurality of transmission points comprises at least a first transmission point and a second transmission point, at least one of the first and second transmission points is movable relative to the other transmission point, wherein the method comprises:

communicating with at least one of the transmission points, storing a list or receiving a signaling, the list or the signaling indicating an occurrence of an in-line interference of the first and the second transmission points, and controlling an access to the at least one transmission point in case the list or the signaling indicates the occurrence of the in-line interference of the first and the second transmission points;

wherein the user device is adapted to transmit a measurement report indicating a link quality to at least one neighboring cell of the user device, wherein the wireless communication system is adapted to select, for a handover of the user device, a transmission point from a reported at least one neighboring cell, wherein the user device is adapted to exclude an avoided transmission point from the measurement report or to set information relating to the avoided transmission point to a predetermined value associated with a status of being an avoided transmission point.

35. A method in a transmission point for a wireless communication system, the wireless communication system comprising transmission points of a plurality of transmission points and a plurality of user devices for communicating with the transmission point, wherein the transmission point and at least one further transmission point of the plurality of transmission points are movable relative to each other;

wherein the method comprises:

communicating with at least one of the user devices, generating a list or a signaling, the list or the signaling indicating an occurrence of an in-line interference of the transmission point and the further transmission point; and transmitting the list or the signaling to the user device which is in a tracking area of the transmission point:

wherein the user device is adapted to transmit a measurement report indicating a link quality to at least one neighboring cell of the user device, wherein the wireless communication system is adapted to select, for a handover of the user device, a transmission point from a reported at least one neighboring cell, wherein the user device is adapted to exclude an avoided transmission point from the measurement report or to set information relating to the avoided transmission point to a predetermined value associated with a status of being an avoided transmission point.

36. A non-transitory digital storage medium having a computer program stored thereon to perform a method in a user device for a wireless communication system, the wireless communication system comprising transmission points of a plurality of transmission points for communicating with the user device, wherein the plurality of transmission points comprises at least a first transmission point and a second transmission point, at least one of the first and second transmission points is a movable transmission point which is movable relative to the other transmission point of the first and second transmission points, wherein the method comprises:

communicating with at least one of the transmission points, storing a list or receiving a signaling, the list or the signaling indicating an occurrence of an in-line interference of the first and the second transmission points, and controlling an access to the at least one transmission point in case the list or the signaling indicates the occurrence of the in-line interference of the first and the second transmission points, when said computer program is run by a computer;

wherein the user device is adapted to transmit a measurement report indicating a link quality to at least one neighboring cell of the user device, wherein the wireless communication system is adapted to select for a handover of the user device, a transmission point from a reported at least one neighboring cell, wherein the user device is adapted to exclude an avoided transmission point from the measurement report or to set information relating to the avoided transmission point to a predetermined value associated with a status of being an avoided transmission point.

37. A non-transitory digital storage medium having a computer program stored thereon to perform a method in a transmission point for a wireless communication system, the wireless communication system comprising transmission points of a plurality of transmission points and a plurality of user devices for communicating with one of the transmission points, wherein one of the transmission points and at least one further transmission point of the plurality of transmission points are movable relative to each other;

wherein the method comprises:

communicating with at least one user device of the plurality of user devices, generating a list or a signaling, the list or the signaling indicating an occurrence of an in-line interference of the transmission point and the further transmission point; and transmitting the list or the signaling to the user device which is in a tracking area of the transmission point, when said computer program is run by a computer;

wherein the user device is adapted to transmit a measurement report indicating a link quality to at least one neighboring cell of the user device, wherein the wireless communication system is adapted to select, for a handover of the user device, a transmission point from a reported at least one neighboring cell, wherein the user device is adapted to exclude an avoided transmission point from the measurement report or to set information relating to the avoided transmission point to a predetermined value associated with a status of being an avoided transmission point.

* * * * *